(12) United States Patent
Hatakeyama et al.

(10) Patent No.: US 7,122,937 B2
(45) Date of Patent: Oct. 17, 2006

(54) ELECTROSTATIC DRIVING DEVICE HAVING AN INTERVAL BETWEEN ELECTRODES FACING EACH OTHER AND MANUFACTURING METHOD OF THE SAME

(75) Inventors: Tomoyuki Hatakeyama, Hachioji (JP); Katsuji Horiuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 169 days.

(21) Appl. No.: 10/795,770

(22) Filed: Mar. 8, 2004

(65) Prior Publication Data
US 2004/0189143 A1 Sep. 30, 2004

(30) Foreign Application Priority Data
Mar. 13, 2003 (JP) ............... 2003-068318

(51) Int. Cl.
*H02N 1/00* (2006.01)
*G02B 26/08* (2006.01)

(52) U.S. Cl. ...................... 310/309; 259/291
(58) Field of Classification Search ............ 310/309; 385/18; 359/290, 291
See application file for complete search history.

(56) References Cited

U.S. PATENT DOCUMENTS

| | | | |
|---|---|---|---|
| 4,973,131 A | | 11/1990 | Carnes ................ 350/166 |
| 5,130,831 A | * | 7/1992 | Kohara et al. ............ 349/155 |
| 6,674,562 B1 | * | 1/2004 | Miles .................... 359/291 |
| 2002/0054422 A1 | | 5/2002 | Carr et al. ................ 359/291 |
| 2002/0057506 A1 | | 5/2002 | Kaneko ................... 359/846 |
| 2004/0189143 A1 | * | 9/2004 | Hatakeyama et al. ....... 310/309 |

* cited by examiner

*Primary Examiner*—Karl Tamai
(74) *Attorney, Agent, or Firm*—Scully, Scott, Murphy & Presser PC (57) ABSTRACT

An electrostatic driving device according to the present invention has a flexible thin film, a holding member, which holds the flexible thin film and allows the flexible thin film to bend, a function member disposed on the flexible thin film, a film-side facing electrode disposed on the flexible thin film, a base, which faces the holding member, a base-side facing electrode, which is disposed on the base and faces the film-side facing electrode; and a bonding spacer member, which is held between the holding member and base, bonds the holding member to the base, and holds an interval between the holding member and base at a predetermined interval so as to keep an electrode interval between the film-side facing electrode and base-side facing electrode at a predetermined interval.

6 Claims, 8 Drawing Sheets

ELECTROSTATIC DRIVING DEVICE HAVING AN INTERVAL BETWEEN ELECTRODES FACING EACH OTHER AND MANUFACTURING METHOD OF THE SAME

CROSS-REFERENCE TO RELATED APPLICATIONS

This application is based upon and claims the benefit of priority from prior Japanese Patent Application No. 2003-068318, filed Mar. 13, 2003, the entire contents of which are incorporated herein by reference.

BACKGROUND OF THE INVENTION

1. Field of the Invention

The present invention relates to an electrostatic driving device and a manufacturing method of the device.

2. Description of the Related Art

A micro variable shape mirror (electrostatic driving device) capable of changing a curvature of a reflective surface has been proposed for the purpose of simplifying a mechanism relating to focusing, in which an electromagnetic actuator has heretofore been used in a micro optical system applied to micro optics such as an optical pickup. Also in a small-sized optical system for image pick-up, the application of the variable shape mirror can largely contribute to miniaturization.

Figure 10:
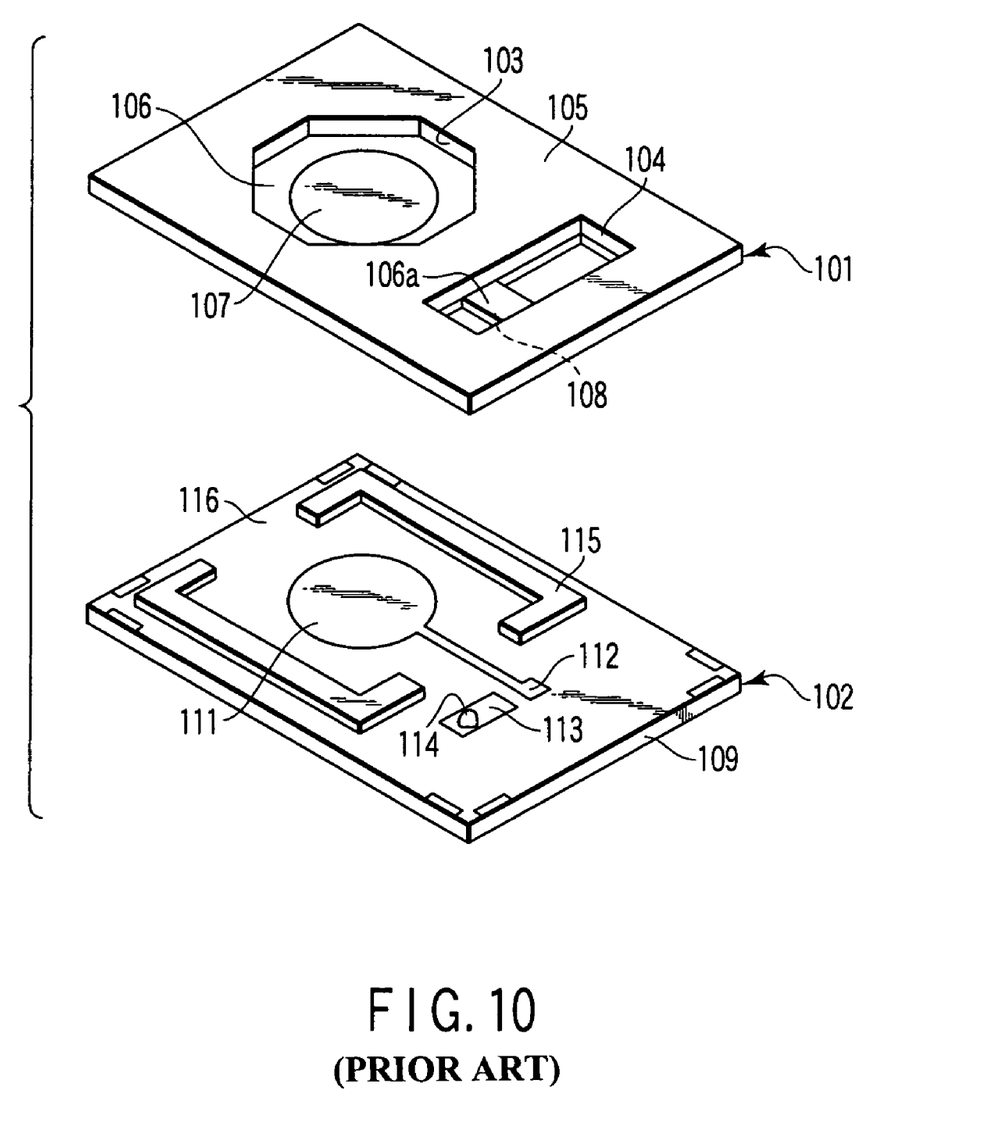
FIG. 10 is an exploded perspective view showing a constitution of a conventional variable shape mirror described in U.S. Patent Application Publication No. 2002/057506A1.

The variable shape mirror can be manufactured in a small size and with high precision by the application of a so-called micro electromechanical system (MEMS) technique, to which a semiconductor manufacturing technique is applied. This type of technique is described, for example, in U.S. Patent Application Publication No. 2002/057506A1. A constitution and manufacturing method of the variable shape mirror described in the U.S. Patent Application Publication No. 2002/057506A1 will be described with reference to FIG. 10. FIG. 10 is an exploded perspective view showing the constitution of the variable shape mirror described in the U.S. Patent Application Publication No. 2002/057506A1. The variable shape mirror includes an upper substrate 101 and a lower substrate 102, which face each other. The upper substrate 101 includes a frame portion 105, in which a mirror opening 103 and an electrode opening 104 are formed, and which is formed of single crystal silicon. A polyimide film 106 is formed on the surface of the frame portion 105, which faces the lower substrate 102. An upper electrode 107 is formed in a predetermined region of the polyimide film 106 seen through the mirror opening 103. The upper electrode 107 is used as a mirror. The polyimide film 106 seen through the electrode opening 104 is removed except a part of the film. A remaining portion 106a is allowed to bend. An upper electrode pad 108 drawn from the upper electrode 107 is formed on the portion 106a. The upper electrode pad 108 faces the lower substrate 102.

The lower substrate 102 includes a single crystal silicon substrate 109. A lower electrode 111, a first electrode pad 112 drawn from the lower electrode 111, and a second electrode pad 113 electrically separated from the lower electrode 111 are formed on the single crystal silicon substrate 109 through an insulating film. An Au bump 114 is formed on the second electrode pad 113.

Two spacers 115 formed of thick-film photoresist are disposed around the lower electrode 111. Two spacers 115 are spatially separated from each other by a cutout 116, and do not completely surround the lower electrode 111. A height of the spacer 115 is slightly smaller than that of the Au bump 114.

The upper substrate 101 is press-bonded to the lower substrate 102. The spacers 115 function as an adhesive. An interval between the upper and lower substrates is regulated by the height of the spacer 115. The height of the Au bump 114 is slightly larger than that of the spacer 115. Therefore, when the upper and lower substrates are bonded to each other, the electrode pad 108 contacts the Au bump 114 and is pushed upwards together with the portion 106a. A tensile force of the portion 106a constantly electrically connects the Au bump 114 to the electrode pad 108. As a result, the upper electrode 107 is conducted to the second electrode pad 113. The lower electrode 111 is conducted to the first electrode pad 112.

When a voltage is applied between these two electrode pads 112, 113, an electrostatic attracting force functions between the upper electrode 107 and lower electrode 111, and the polyimide film 106 is deformed together with the upper electrode 107. When the electrostatic attracting force is appropriately adjusted, the curvature of the surface of the upper electrode 107 can be set to a desired value.

Since the upper electrode 107 is conducted to the second electrode pad 113 of the lower substrate 102, lead wires for applying the voltage are connected only to the lower substrate 102. The lead wires do not have to be connected to the upper substrate 101 and lower substrate 102. When the lead wires are connected, a load is generated. When the lead wires are connected to the upper substrate 101 and lower substrate 102, distortion is caused in both the substrates. On the other hand, when the lead wires are connected only to the lower substrate 102, the distortion is not generated in the upper substrate 101. Therefore, any distortion is generated in the upper electrode 107 for use as a mirror. Therefore, image-forming properties of the mirror can be prevented from dropping.

The spacers 115 are formed on the silicon substrate 109 using the thick-film photoresist. The spacers 115 can be formed with high precision at once together with the lower electrode 111 and the like. Therefore, the upper substrate 101 can easily be bonded to the lower substrate 102.

At the time of the press-bonding, the spacers 115 formed of the thick-film photoresist are heated and softened. A pressure is added to the softened spacers 115 through the upper substrate 101 and lower substrate 102. When the pressure added at this time is appropriately adjusted, the substrate interval between the upper substrate 101 and lower substrate 102 can be set to a desired value. The substrate interval requires a high precision. Therefore, it is necessary to use expensive bonding devices capable of controlling the pressure with the high precision such as a flip chip bonder.

BRIEF SUMMARY OF THE INVENTION

The present invention is, in an aspect, directed to an electrostatic driving device that is allowed to keep an interval between electrodes facing each other. An electrostatic driving device according to the present invention comprises a flexible thin film, a holding member, which holds the flexible thin film and allows the flexible thin film to bend, a function member disposed on the flexible thin film, a film-side facing electrode disposed on the flexible thin film, a base, which faces the holding member, a base-side facing electrode, which is disposed on the base and faces the film-side facing electrode; and a bonding spacer member, which is held between the holding member and base, bonds the holding member to the base, and holds an interval between the holding member and base at a predetermined interval so as to keep an electrode interval between the film-side facing electrode and base-side facing electrode at a predetermined interval.

The present invention is, in another aspect, directed to a method of manufacturing this electrostatic driving device. A manufacturing method according to the present invention, comprises a member preparing step of preparing the holding member, on which the function member and film-side facing electrode are disposed, and the base, on which the base-side facing electrode is disposed, a mixing step of preparing an adhesive-containing bonding member and rigid members, and mixing the prepared bonding member and rigid members so that the rigid members is scattered in the bonding member to form a mixed member including the mixed bonding member and rigid members, a supplying step of supplying the mixed member to one of the prepared holding member and base, a positioning step of positioning the holding member and base so that the supplied mixed member is held between the holding member and base, and that the film-side facing electrode faces the base-side facing electrode, a press-bonding step of press-bonding the positioned holding member and base, and a hardening step of hardening the adhesive contained in the bonding member in the mixed member held between the holding member and base so that the mixed member held between the holding member and base forms the bonding spacer member, the hardened mixed member forming the bonding spacer member.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An electrostatic driving device and a method of manufacturing the device according to embodiments of the present invention will be described with reference to FIGS. 1 to 9.

Figure 1A:
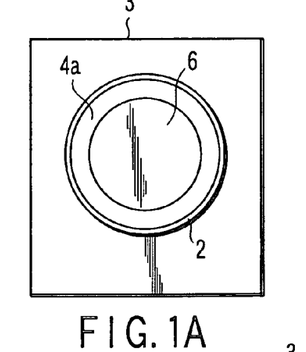
FIG. 1A is a plan view of a holding member of an electrostatic driving device according to a first embodiment of the present invention.
Figure 1B:
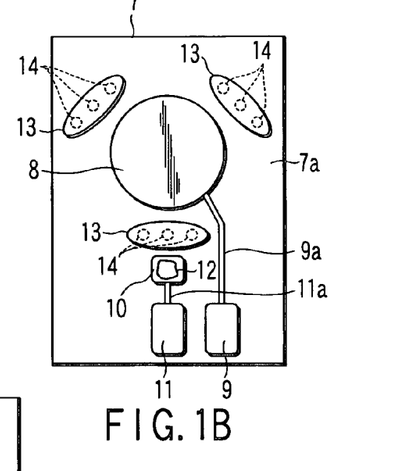
FIG. 1B is a plan view of a base of the electrostatic driving device according to the first embodiment.
Figure 1C:
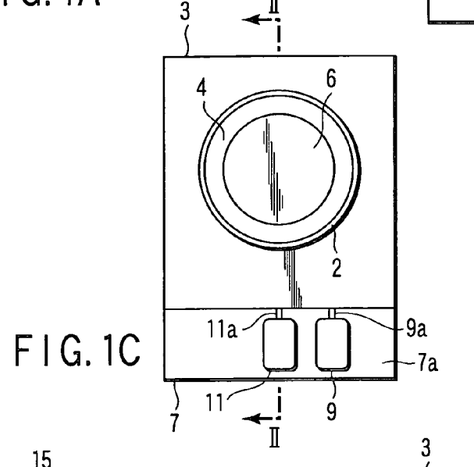
FIG. 1C is a plan view of the electrostatic driving device according to the first embodiment as viewed from the holding member side.
Figure 2:
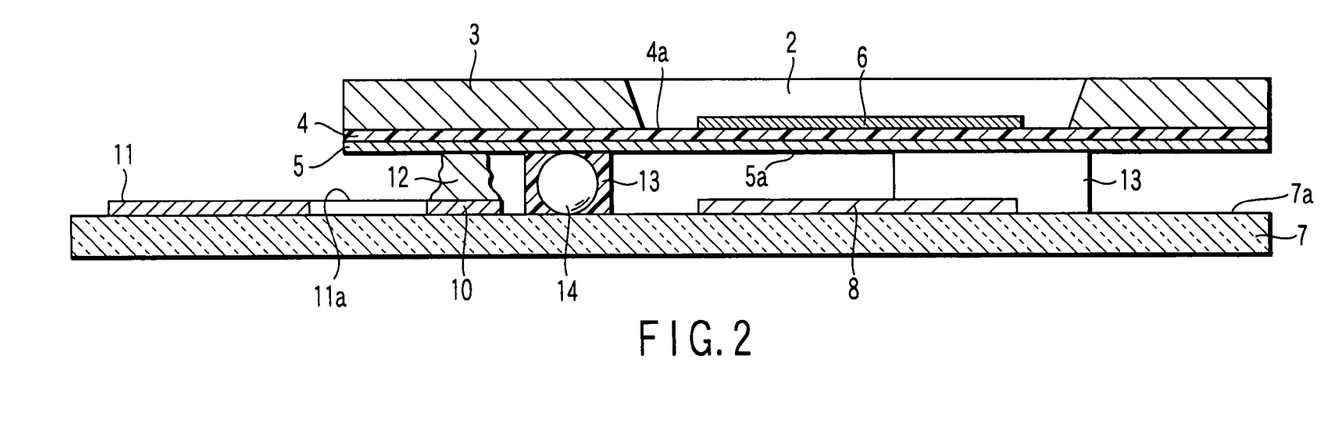
FIG. 2 is a sectional view of the electrostatic driving device taken along sectional line II—II of FIG. 1C.

First, the electrostatic driving device of a first embodiment of the present invention will be described with reference to FIGS. 1A, 1B, 1C, and 2. The electrostatic driving device comprises a flexible thin film 4, a holding member 3, which holds the flexible thin film 4 and allows the flexible thin film 4 to deform, and a base 7, which faces the holding member 3. FIG. 1A is a plan view of the holding member 3, and the surface positioned opposite to the surface that faces the base 7 is shown. FIG. 1B is a plan view of the base 7. A surface 7a facing the holding member 3 is shown. FIG. 1C is a plan view of the electrostatic driving device as viewed from a holding member 3 side. FIG. 2 is a sectional view of the electrostatic driving device taken along sectional line II—II of FIG. 1C.

The holding member 3 has a flat plate like shape and is formed of single crystal silicon. The holding member 3 has a circular hole 2. The flexible thin film 4 spreads over the surface of the holding member 3 facing the base 7. The flexible thin film 4 is formed of polyimide. A portion of the flexible thin film 4 seen through the hole 2 forms a flexible portion 4a that is allowed to bend. The periphery of the flexible portion 4a is held by the holding member 3.

The electrostatic driving device has a function member. The function member is disposed on the surface of the flexible portion 4a on a side opposite to the base 7. In the present embodiment, the function member comprises a circular reflective film 6 formed of aluminum. The reflective film 6 spreads on the flexible portion 4a. The function member functions in accordance with the bending of the flexible thin film 4. In the present embodiment, the reflective film 6 is deformed in accordance with the bending of the flexible thin film 4.

A conductive film 5 is disposed on the flexible thin film 4. The conductive film 5 contains chromium. The conductive film 5 spreads on the whole surface of the flexible thin film 4 on a base 7 side. The conductive film 5 has a portion that faces the flexible portion 4a to form the film-side facing electrode 5a.

The base 7 has a flat plate like shape, and is formed of glass. The electrostatic driving device has a base-side facing electrode 8 facing the film-side facing electrode 5a, and the base-side facing electrode 8 is disposed on the base 7. The base-side facing electrode 8 is formed of a circular aluminum film, and is fixed to the base 7 on its surface 7a facing the holding member 3. A conductive electrode pad 10, an external electrode 9 that is prepared for the base 7 and an external electrode 11 that is prepared for the flexible thin film 4 are fixed to the base 7 on the surface 7a. The base-side facing electrode 8 is connected to the external electrode 9 through a wiring 9a, and the electrode pad 10 is connected to the external electrode 11 through a wiring 11a. The external electrode 9 and external electrode 11 are positioned on the surface 7a at positions that are not covered with the holding member 3.

Lead wires may also be connected to the external electrode 9 and external electrode 11 in order to apply a voltage. A load is generated in connecting the lead wires. For example, when the load is generated in the holding member 3, the holding member 3 is sometimes distorted. The distortion of the holding member 3 distorts the reflective film 6, and lowers an image forming property of the reflective film 6. Since both the external electrodes 9 and 11 are disposed on the base 7, the load is generated only in the base 7 in connecting the lead wires. Any load is not generated in the holding member 3. Therefore, since any distortion is not generated in the holding member 3, the image forming property of the reflective film 6 can be prevented from dropping.

As shown in FIG. 2, the electrostatic driving device includes a bonding spacer member, which bonds the holding member 3 and base 7. The bonding spacer member is held between the holding member 3 and base 7 through the flexible thin film 4 and conductive film 5. The bonding spacer member comprises a bonding member 13 containing adhesive and rigid members 14 having rigidity. The bonding member 13 may comprise only a portion that continuously extends around the film-side facing electrode 5a and base-side facing electrode 8 so that the rigid members 14 are scattered in that portion. The bonding member 13 may also comprise portions that are spatially separated and located around the film-side facing electrode 5a and base-side facing electrode 8 and individually include at least one of the rigid members 14. In the present embodiment, as shown in FIG. 1B, the bonding member 13 comprises three portions that are located around the base-side facing electrode 8 and individually include three of the rigid members 14, and the three rigid members 14 are scattered in the corresponding portion. The bonding spacer member bonds the holding member 3 and base 7, and keeps an interval between the holding member 3 and base 7 at a predetermined interval to keep an electrode interval between the film-side facing electrode 5a and base-side facing electrode 8 at a predetermined interval. The bonding member 13 bonds the holding member 3 and base 7, and the rigid members 14 keep the interval between the holding member 3 and base 7 at the predetermined interval.

The rigid members 14 are spherical and are formed of plastic particles. The rigid members 14 have a substantially equal size. The plastic particles may be plastic particulates, for example, obtainable from Sekisui Chemical Co., Ltd. and having trade name "Micro Pearl". The plastic particulates have an average particle diameter of 3 µm to 30 µm. The interval between the holding member 3 and base 7 is equal to the particle diameter of plastic particle. The bonding member 13 contains a low-elasticity silicone-based adhesive, which hardens at normal temperature. The adhesive is of a UV hardening type.

A conductive adhesive 12 containing silver paste is disposed between the conductive film 5 and electrode pad 10. The conductive adhesive 12 bonds the conductive film 5 and electrode pad 10, and electrically connects the conductive film 5 to the electrode pad 10 to conduct the film-side facing electrode 5a to the external electrode 11. The conductive adhesive 12 may be a two-liquids mixed type of conductive adhesive obtainable, for example, from Nihon Able Stick Co. When a main agent is mixed with a hardening agent and hardened at normal temperature, the conductive adhesive is formed.

When the voltage is applied between the external electrode 9 and external electrode 11, an electrostatic attracting force functions on the base-side facing electrode 8 and film-side facing electrode 5a. The reflective film 6 is deformed in accordance with the electrostatic attracting force. When the voltage is appropriately adjusted, a curvature on the surface of the reflective film 6 can be set to a desired value.

Figure 3:
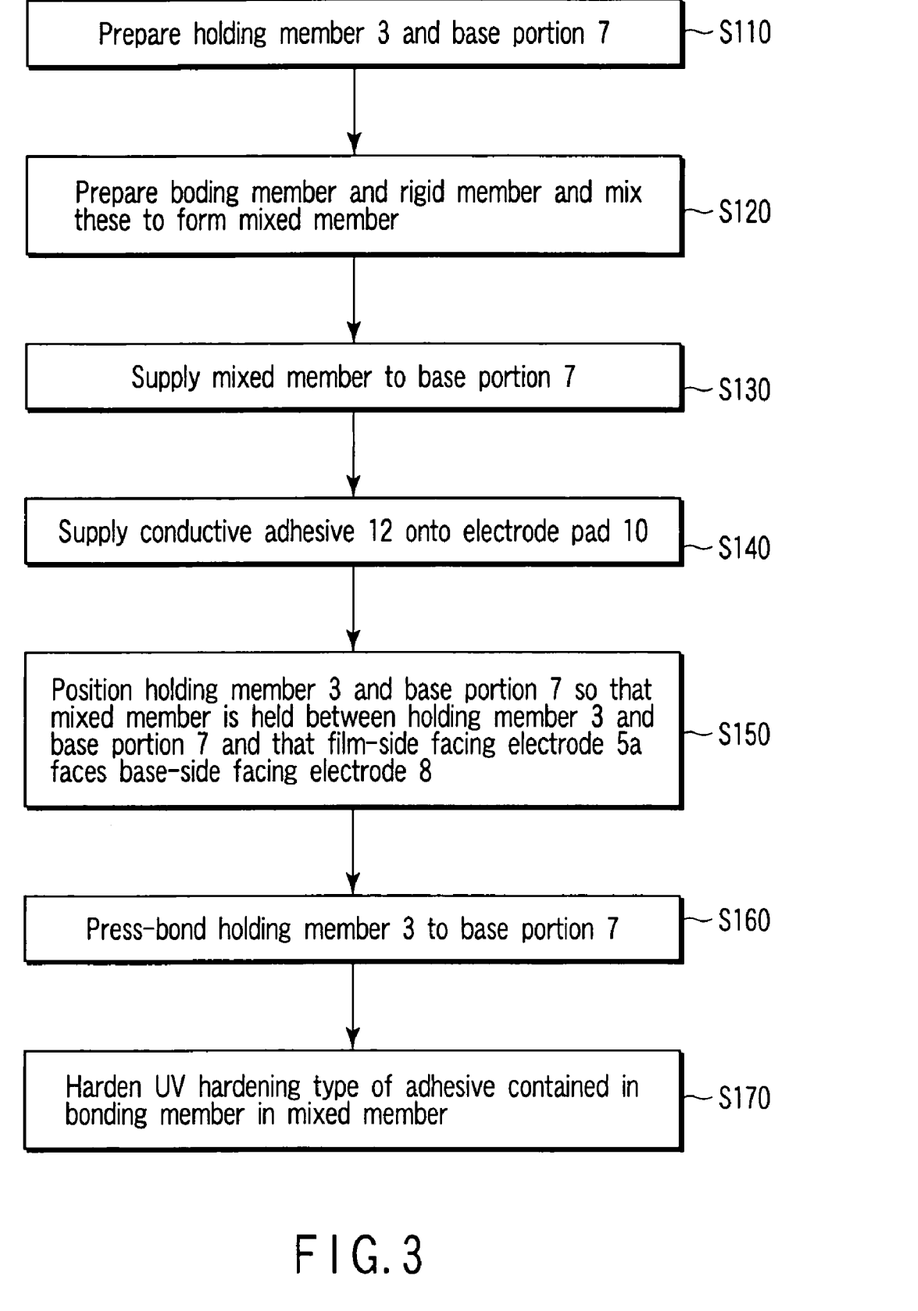
FIG. 3 is a flowchart of a manufacturing method of the electrostatic driving device according to the first embodiment.

A manufacturing method of the electrostatic driving device of the first embodiment will be described with reference to FIG. 3. FIG. 3 is a flowchart of the manufacturing method. First, the holding member 3 holding the flexible thin film 4, on which the function member (reflective film 6) and film-side facing electrode 5a are disposed, and the base 7, on which the base-side facing electrode 8 is disposed are prepared (member preparing step S110). As described above, the film-side facing electrode 5a forms a part of the conductive film 5. The wiring 9a, external electrode 9, electrode pad 10, wiring 11a, and external electrode 11 are disposed on the prepared base 7.

Next, the bonding member containing adhesive and rigid members having rigidity are prepared, and the bonding member and rigid members are mixed so that the rigid members are scattered in the bonding member to form the mixed member including the mixed bonding member and rigid members (mixing step S120). In the present embodiment, plastic particulates having an average particle diameter of 3 µm to 30 µm are used for the rigid members.

Next, the mixed member is supplied to one of the prepared holding member 3 and base 7. In the present embodiment, the mixed member is supplied to the base 7 (supplying step S130). The prepared mixed member is supplied to three places around the base-side facing electrode 8 by a screen printing process. During the screen printing, the base 7 is covered with a metal mask having an opening with a predetermined shape and having a thickness of 100 to 150 µm. After supplying the mixed member onto the metal mask, the mixed member is printed into the opening of the metal mask with a rubber squeegee. The printed mixed member has a flat plate like shape. The thickness of the member is substantially equal to that of the metal mask. The plastic particulates are scattered in a surface direction of a flat plate at a density of 40 to 50 particles/mm$^2$. A mixture ratio of the bonding member and rigid members (plastic particulates) prepared in the mixing step S120 is determined so that the plastic particulates are scattered with this density at the screen printing time. Thereafter, when the metal mask is removed, the mixed member remains in a predetermined position of the base 7. With the use of the screen printing, the mixed member can be supplied to the desired position of the base 7 with good precision.

Next, the two-liquids mixed type of conductive adhesive 12 is supplied onto the electrode pad 10 (conductive adhesive supplying step S140). At this time, the main agent and hardening agent are prepared and mixed. The mixture is applied onto the electrode pad 10 with a dispenser. The height of the applied mixture is larger than the particle diameter of the plastic particulates. It is to be noted that S130 may also be performed after this S140.

Next, the holding member 3 and base 7 are positioned so that the mixed member supplied in the supplying step S130 is held between the holding member 3 and base 7 and that the film-side facing electrode 5a faces the base-side facing electrode 8 (positioning step S150).

Next, the positioned holding member 3 and base 7 are press-bonded (press-bonding step S160), and the UV hardening type of adhesive contained in the bonding member in the mixed member held between the holding member 3 and base 7 is hardened (hardening step S170). At this time, while the holding member 3 is pressed onto the base 7, ultraviolet light is irradiated to the mixed member through the base 7 formed of glass to harden the adhesive. When the holding member 3 is pressed onto the base 7 with a pressure larger than a predetermined pressure, the mixed member collapses, and the interval between the holding member 3 and base 7 is substantially equal to the particle diameter (dimension of the rigid member) of the plastic particulates. Since the plastic particulates are spherical, the plastic particulates and bonding member between the holding member 3 and base 7 are easily removed. The pressure with which the holding member 3 is pressed onto the base 7 is set to be larger than the predetermined pressure. Additionally, the pressure for pressing the holding member 3 onto the base 7 is determined so that the rigid members are prevented from being broken or deformed, when the holding member 3 is pressed onto the base 7. In the present embodiment, the pressure for pressing the holding member 3 onto the base 7 is determined so as to prevent a load having a weight of 5 g or more from being applied to one plastic particulate. The mixed member containing the adhesive hardened in the hardening step S170 forms the bonding spacer member.

In the conventional variable shape mirror described in the U.S. Patent Application Publication No. 2002/057506A1, the pressure added to the upper substrate 101 and lower substrate 102 at the press-bonding time has to be adjusted with high precision, it is necessary to use an expensive press-bonding device capable of controlling the pressure with high precision, and manufacturing costs are high. On the other hand, in the present embodiment, since the pressure for pressing the holding member 3 onto the base 7 does not have to be adjusted with the high precision, the manufacturing costs are low.

Since the adhesive contained in the bonding member is a low-elasticity silicone-based adhesive, a stress is not easily generated in the holding member 3 and base 7 after the hardening. Therefore, since the holding member 3 is hardly distorted after the hardening, the reflective film 6 is hardly distorted. Therefore, the image forming property of the reflective film 6 can be prevented from dropping.

The adhesive contained in the bonding member hardens at normal temperature. Additionally, in the conventional variable shape mirror described in the U.S. Patent Application Publication No. 2002/057506A1, the spacers 115 used as the adhesive at the time of bonding the upper substrate 101 and lower substrate 102 is heated. In another typical variable shape mirror, a thermosetting adhesive is used for bonding the upper and lower substrates. On the other hand, in the present embodiment, since the heating is not necessary, the holding member 3 is not distorted, and the image forming property of the reflective film 6 does not drop. It is to be noted that when the image forming property required for the reflective film 6 is relatively low, the mixed member may also be heated to promote the hardening of the adhesive contained in the bonding member.

Since the height of the two-liquids mixed type of conductive adhesive 12 supplied onto the electrode pad 10 in the conductive adhesive supplying step S140 is larger than the particle diameter of the plastic particulate, the conductive adhesive 12 adheres to the conductive film 5 in the press-bonding step S160. The conductive adhesive 12 completely hardens in 24 hours after the main agent is mixed with the hardening agent.

Figure 4A:
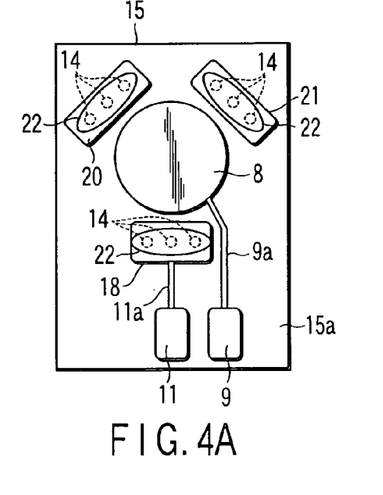
FIG. 4A is a plan view of the base of the electrostatic driving device according to a second embodiment of the present invention.
Figure 4B:
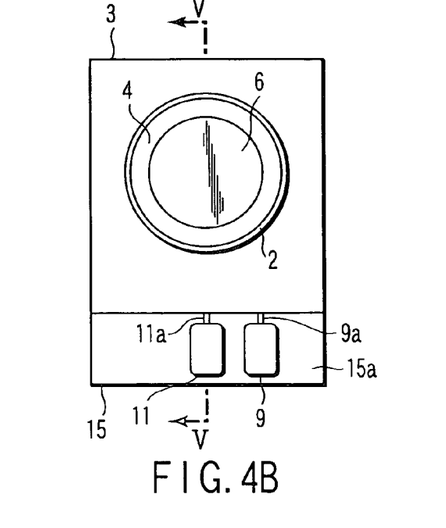
FIG. 4B is a plan view of the electrostatic driving device according to the second embodiment as viewed from the holding member side.
Figure 5:
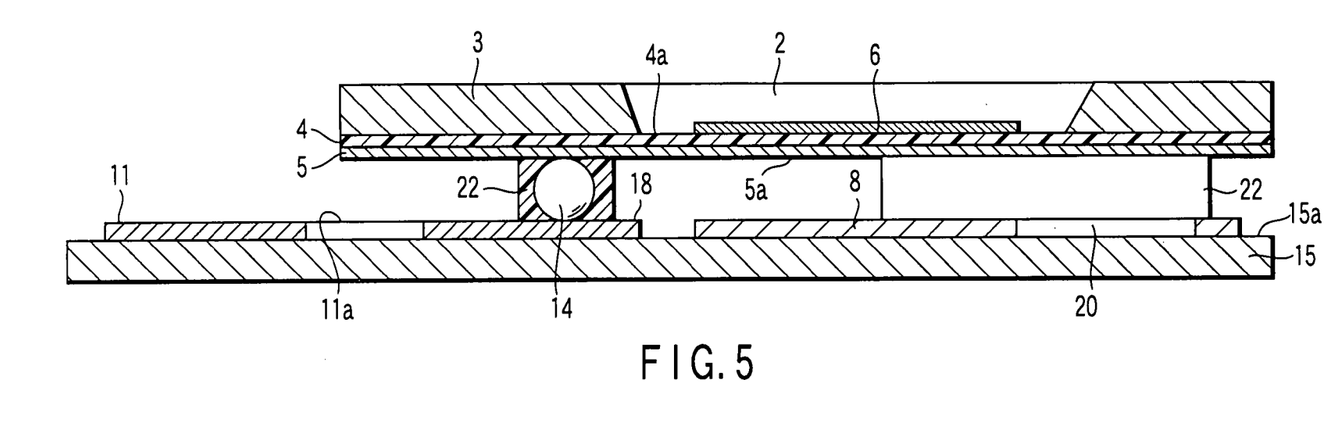
FIG. 5 is a sectional view of the electrostatic driving device taken along sectional line V—V of FIG. 4B.

The electrostatic driving device of a second embodiment of the present invention will now be described with reference to FIGS. 4A, 4B, and 5. Substantially the same constituting members as those of the first embodiment are denoted with the same reference numerals and a detailed description thereof is omitted. The electrostatic driving device of the present embodiment has substantially the same holding member 3, flexible thin film 4, conductive film 5, and reflective film 6 as those of the first embodiment. The electrostatic driving device has a base 15, which faces the holding member 3. FIG. 4A is a plan view of the base 15, and a surface 15a facing the holding member 3 is shown. FIG. 4B is a plan view of the electrostatic driving device as viewed from the holding member 3 side. FIG. 5 is a sectional view of the electrostatic driving device taken along sectional line V—V of FIG. 4B. The base 15 has a flat plate like shape, and is formed of silicon. The base-side facing electrode 8 facing the film-side facing electrode 5a and formed of a circular aluminum film is disposed on the surface 15a of the base 15. A conductive electrode pad 18 and dummy pads 20 and 21 are fixed to the surface 15a. The pads 18, 20, and 21 surround the base-side facing electrode 8. The pads 18, 20, and 21 have sheet shapes and equal thickness. The external electrode 9 and external electrode 11 are fixed to the surface 15a in the same manner as in the first embodiment. The base-side facing electrode 8 is connected to the external electrode 9 through the wiring 9a, and the electrode pad 18 is connected to the external electrode 11 through the wiring 11a. The external electrode 9 and external electrode 11 are disposed on the surface 15a at positions that are not covered with the holding member 3.

As shown in FIG. 5, the electrostatic driving device includes the bonding spacer member, which bonds the holding member 3 and base 15. The bonding spacer member is held between the holding member 3 and base 15. The bonding spacer member includes a bonding member 22 and the rigid members 14, which are scattered in the bonding member 22. The bonding member 22 comprises three portions. One of the three portions is held through the flexible thin film 4, conductive film 5, and electrode pad 18. Another portion is held through the flexible thin film 4, conductive film 5, and dummy pad 20. The other portion is held through the flexible thin film 4, conductive film 5, and dummy pad 21.

At least one of the bonding member 22 and rigid members 14 has conductivity. In the present embodiment, the bonding member 22 has the conductivity. The bonding member 22 contains the conductive adhesive. The rigid members may also have the conductivity. In this case, metal particles or plastic particles whose surfaces are plated with metals are used in the rigid members.

A conductive film-side connecting member is disposed on the holding member 3 to electrically connect the film-side facing electrode 5a to the bonding member 22 of the bonding spacer member. The film-side connecting member is included in the conductive film 5. A conductive base-side connecting member is disposed on the base 15 to electrically connect the external electrode 11 to the bonding member 22 of the bonding spacer member. The base-side connecting member includes the electrode pad 18 and wiring 11a. The film-side facing electrode 5a is conducted to the external electrode 11 through the film-side connecting member, bonding member 22, and base-side connecting member.

The rigid members 14 are substantially the same as that of the first embodiment. The interval between the holding member 3 and base 15 is equal to a sum of a dimension of the rigid members 14, and thickness of the flexible thin film 4, conductive film 5, and pad 18 (or the pad 20 or 21).

Figure 6:
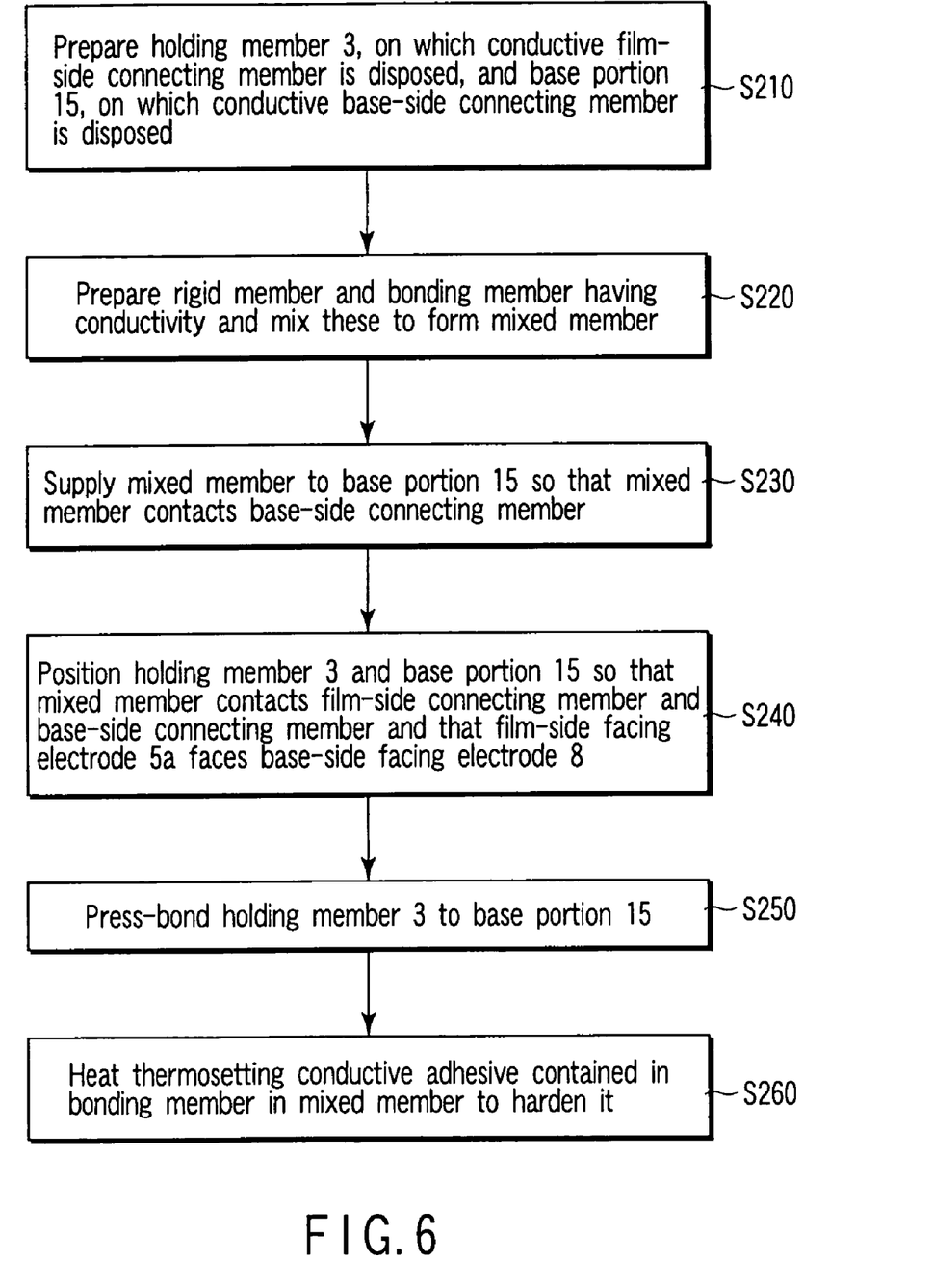
FIG. 6 is a flowchart of the manufacturing method of the electrostatic driving device according to the second embodiment.

A method of manufacturing the electrostatic driving device of the second embodiment will be described with reference to FIG. 6. FIG. 6 is a flowchart of the manufacturing method. First, the holding member 3, on which the conductive film-side connecting member is disposed, and the base 15, on which the conductive base-side connecting member is disposed, are prepared (member preparing step S210). The flexible thin film 4, conductive film 5, and reflective film 6 are disposed on the prepared holding member 3. The conductive film 5 includes the conductive film-side connecting member electrically connected to the film-side facing electrode 5a. The base-side facing electrode 8, wiring 9a, external electrode 9, wiring 11a, external electrode 11, electrode pad 18, and dummy pads 20 and 21 are disposed on the prepared base 15. The electrode pad 18 and wiring 11a are included in the base-side connecting member.

Next, the rigid members and bonding member having conductivity are prepared and mixed to form the mixed member (mixing step S220). The bonding member contains the conductive adhesive. The conductive adhesive is of a thermosetting type. It is to be noted that the manufactured electrostatic driving device may also include the rigid members having the conductivity. In this case, the rigid members prepared in the mixing step have conductivity.

Next, the mixed member is supplied to the prepared base 15 (supplying step S230). The mixed member is supplied onto the electrode pad 18 and dummy pads 20 and 21. Since the mixed member contacts the base-side connecting member including the electrode pad 18, the mixed member is electrically connected to the external electrode 11. The mixed member may also be supplied to the holding member 3 instead of the base 15. In this case, since the mixed member contacts the film-side connecting member included in the conductive film 5, the mixed member is electrically connected to the film-side facing electrode 5a. The mixed member is supplied in the screen printing process.

Next, the holding member 3 and base 15 are positioned so that the mixed member supplied in the supplying step S230 contacts the film-side connecting member and base-side connecting member and that the film-side facing electrode 5a faces the base-side facing electrode 8 (positioning step S240). At this time, the mixed member is held between the holding member 3 and base 15.

Next, the positioned holding member 3 and base 15 are press-bonded (press-bonding step S250), and the thermosetting conductive adhesive contained in the bonding member in the mixed member held between the holding member 3 and base 15 is heated and hardened (hardening step S260). At this time, while the holding member 3 is pressed onto the base 15, the mixed member is heated at 80° C. to 150° C. The interval between the holding member 3 and base 15 is equal to the sum of the dimension of the rigid members 14 and the thickness of the flexible thin film 4, conductive film 5, and pad 18 (or the pad 20 or 21). The interval is substantially equal to the dimension of the rigid members.

The mixed member containing the adhesive hardened in the hardening step S260 forms the bonding spacer member.

The bonding spacer member keeps the interval between the holding member 3 and base 15, and not only bonds these but also conducts the film-side facing electrode 5a to the external electrode 11. The manufacturing method described with reference to FIG. 3 includes the step of supplying the conductive adhesive 12 onto the electrode pad 10 for this conduction, but the manufacturing method of the present embodiment does not require this step. Therefore, good productivity is obtained.

Figure 7A:
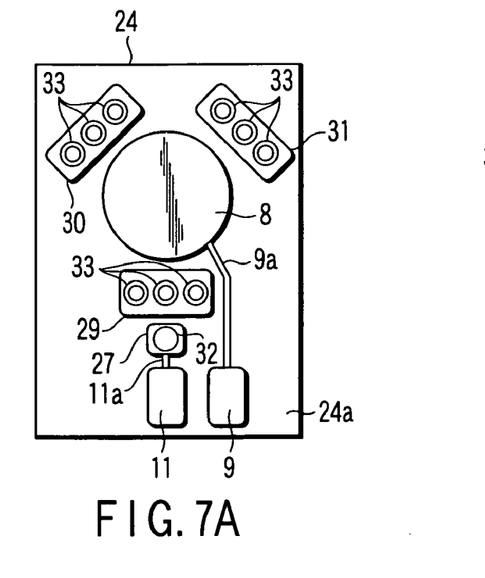
FIGS. 7A and 7B are plan views of the base of the electrostatic driving device according to a third embodiment of the present invention.
Figure 7B:
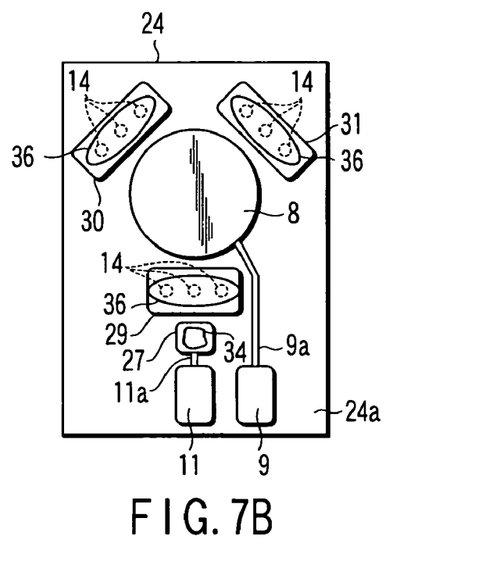
Figure 7C:
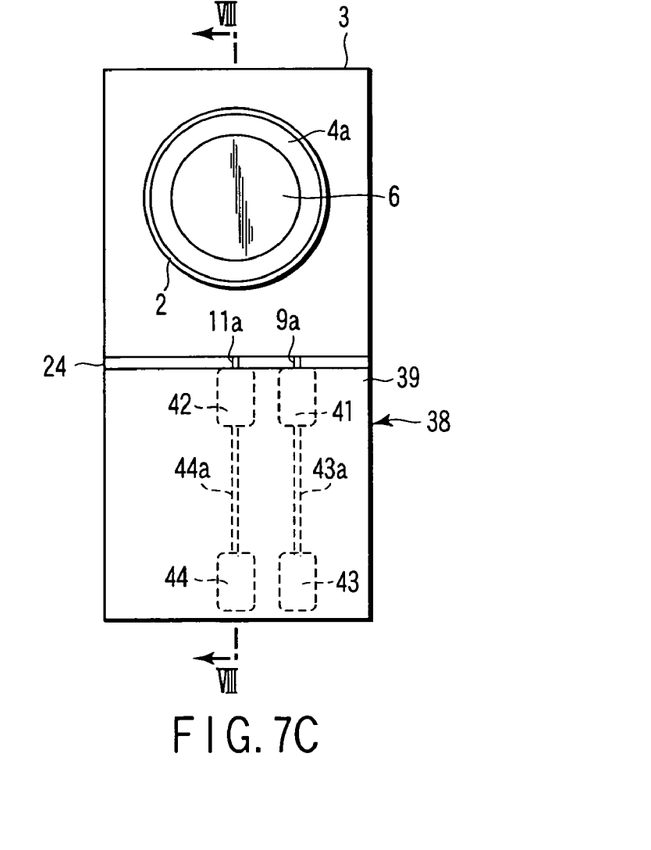
FIG. 7C is a plan view of the electrostatic driving device according to the third embodiment as viewed from the holding member side.
Figure 8:
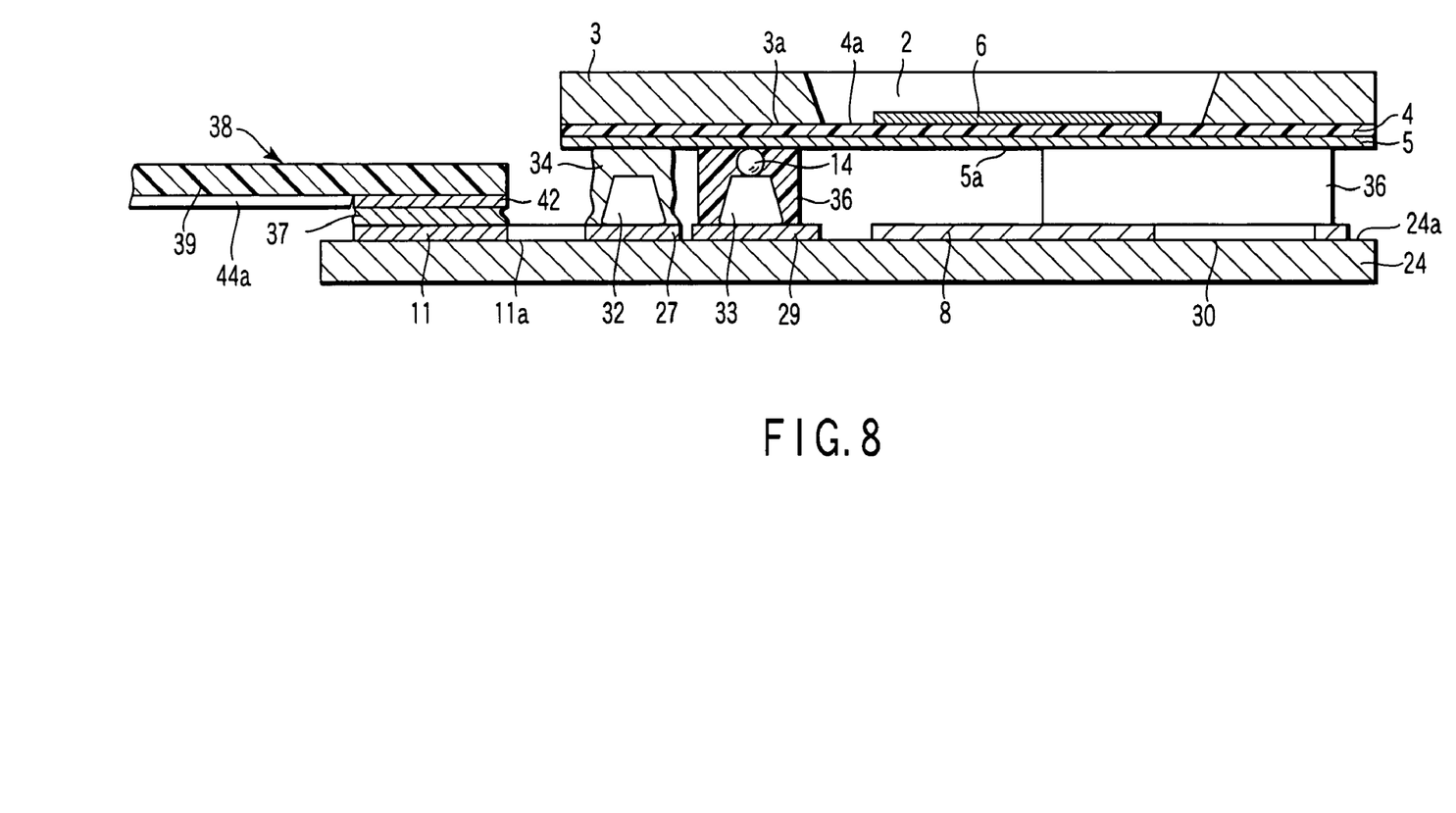
FIG. 8 is a sectional view of the electrostatic driving device taken along sectional line VIII—VIII of FIG. 7C.

The electrostatic driving device of a third embodiment of the present invention will now be described with reference to FIGS. 7A, 7B, 7C, and 8. Substantially the same constituting members as those of the first embodiment are denoted with the same reference numerals and a detailed description thereof is omitted. The electrostatic driving device has substantially the same holding member 3, flexible thin film 4, conductive film 5, and reflective film 6 as those of the first embodiment. The electrostatic driving device includes a base 24, which faces the holding member 3. The electrostatic driving device includes the bonding spacer member for bonding the holding member 3 and base 24. The bonding spacer member is held between the holding member 3 and base 24. The bonding spacer member includes a bonding member 36, which contains silicone adhesive, and the rigid members 14, which are substantially the same number of as those of the first embodiment. FIGS. 7A and 7B are plan views of the base 24, and a surface 24a facing the holding member 3 is shown. FIG. 7A does not show the bonding spacer member, and FIG. 7B shows the bonding spacer member. FIG. 7C is a plan view of the electrostatic driving device as viewed from the holding member 3 side. FIG. 8 is a sectional view of the electrostatic driving device taken along sectional line VIII—VIII of FIG. 7C. The base 24 has a flat plate like shape, and is formed of silicon. The base-side facing electrode 8 facing the film-side facing electrode 5a is disposed on the surface 24a of the base 24. A conductive electrode pad 27, and dummy pads 29, 30, and 31 are fixed to the surface 24a. The dummy pads 29, 30, and 31 surround the base-side facing electrode 8. The pads 27, 29, 30, and 31 have the sheet shapes and the equal thickness. The external electrode 9 and external electrode 11 are fixed to the surface 24a. The base-side facing electrode 8 is connected to the external electrode 9 through the wiring 9a, and the electrode pad 27 is connected to the external electrode 11 through the wiring 11a. The external electrode 9 and external electrode 11 are disposed on the surface 24a at positions that are not covered with the holding member 3.

The electrostatic driving device includes protrusions that are positioned between the holding member 3 and base 24 and protrude from one of the holding member 3 and base 24, and the other of the holding member 3 and base 24 includes a facing surface that faces tips of the protrusions. In the present embodiment, protrusions 33 protrude from the base 24 through the dummy pads 29, 30, 31 (see FIG. 7A), and the holding member 3 has a facing surface 3a. A protrusion 32 having a height equal to that of the protrusion 33 is disposed on the electrode pad 27. The protrusions 32, 33 are formed of Au bumps. In the present embodiment, the protrusions 32, 33 have the equal height, but the present invention is not limited to this. The protrusions 32, 33 may not have the equal height. The protrusions 32, 33 may also be formed of rigid metal members that are not deformed unless a constant or more pressure is added, such as Ni.

The electrostatic driving device includes the bonding spacer member, which includes a bonding member 36 and the rigid members 14, which are scattered in the bonding member 36. The bonding member 36 comprises three portions, which individually include some of the rigid members 14 and surround protrusions 33 on the dummy pads 29, 30, and 31. The rigid members 14 are scattered in the bonding member 36. Some of the scattered rigid members 14 and a part of the bonding member 36 are held between the tips of the protrusions 33 and the facing surface 3a through the flexible thin film 4 and conductive film 5. The bonding member 36 bonds the holding member 3 and base 24 through the flexible thin film 4 and conductive film 5. The interval between the holding member 3 and base 24 is equal to the sum of the thickness of the dummy pad 29 (or the pad 30 or 31), the height of the protrusion 33, the dimension of the rigid members 14, and the thickness of the flexible thin film 4 and conductive film 5. Since the height of the protrusion 33 can comparatively easily be changed, the electrode interval between the film-side facing electrode 5a and base-side facing electrode 8 can easily be changed. This is effective, when the electrode interval of the electrostatic driving device having a comparatively large electrode interval is changed.

The protrusion 32 is surrounded with a conductive adhesive 34. The conductive adhesive 34 is held between the tip of the protrusion 32 and the conductive film 5 to conduct the film-side facing electrode 5a to the external electrode 11.

The electrostatic driving device includes a flexible substrate 38. The flexible substrate 38 includes a polyimide substrate 39 formed of polyimide. On the polyimide substrate 39, two intermediate electrodes 41 and 42, two external electrodes 43 and 44, and two electric wirings 44a and 43a for electrically connecting the intermediate electrodes 41 and 42 to the external electrodes 43 and 44 are disposed. The electric wirings 44a and 43a are electrically connected to the external electrode 9 and external electrode 11 with an anisotropic conductive adhesive 37 through the intermediate electrodes 41 and 42. The anisotropic conductive adhesive 37 contains epoxy-based adhesive and conductive particles formed of nickel. The anisotropic conductive adhesive 37 may also contain particles plated with nickel or gold in the plastic particles instead of the conductive particles of nickel. The electric wirings 44a and 43a are formed of copper.

Since the flexible substrate 38 can be used for electric connection to the outside, large shaped connecting devices such as a connector and lead wires do not have to be disposed in the vicinity of the holding member 3. Therefore, the present invention can easily be mounted onto small-sized products requiring space saving in arrangement, such as a cellular phone and camera.

Figure 9:
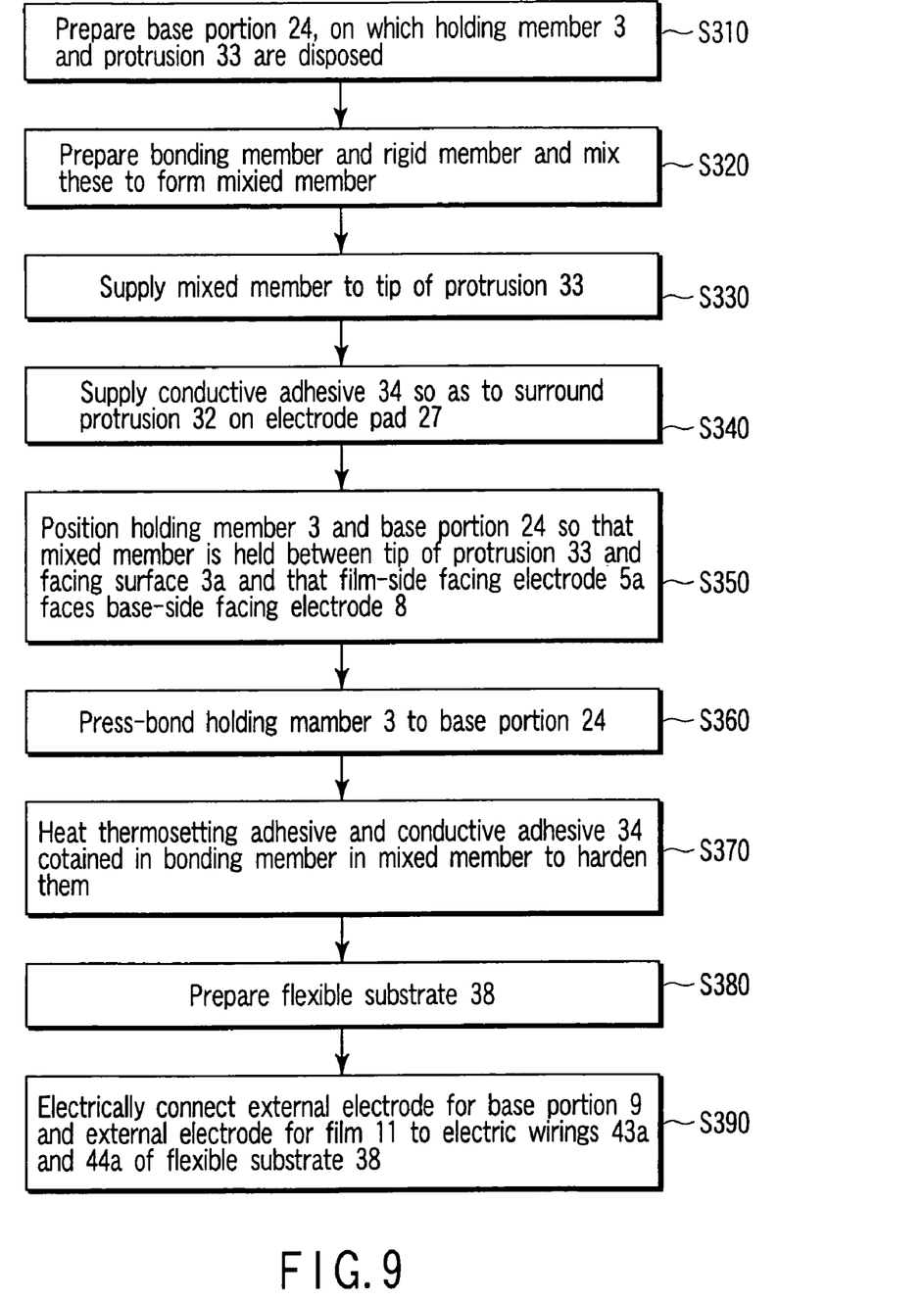
FIG. 9 is a flowchart of a manufacturing method of the electrostatic driving device according to the third embodiment.

A method of manufacturing the electrostatic driving device of the third embodiment will be described with reference to FIG. 9. FIG. 9 is a flowchart of the manufacturing method. First, the holding member 3 and the base 24, on which the protrusions 33 are disposed, are prepared (member preparing step S310). The flexible thin film 4, conductive film 5, and reflective film 6 are disposed on the prepared holding member 3. The base-side facing electrode 8, wiring 9a, external electrode 9, wiring 11a, external electrode 11, electrode pad 27, dummy pads 29, 30, 31, and protrusion 32 are disposed on the prepared base 24. The protrusions 33 protrude from the base 24 through the dummy pads 29, 30, 31. The protrusions 33 may protrude from the holding member 3 prepared instead of the prepared base 24. The protrusions 32, 33 are formed of Au bumps. When the holding member 3 and base 24 are prepared, the protrusions 32, 33 are formed by a stud bump process.

Next, the rigid members and bonding member are prepared and mixed to form the mixed member (mixing step S320). The bonding member contains a silicone adhesive. The silicone adhesive is of a thermosetting type.

Next, the mixed member is supplied to the tips of the protrusions 33 (supplying step S330). The mixed member is supplied by the screen printing process. At this time, the mixed member is supplied so as to cover the dummy pads 29, 30, 31. A part of the mixed member supplied in this manner is supplied to the tips of the protrusions 33. The thickness of the mixed member supplied to the tips of the protrusions 33 is larger than the dimension of the rigid members.

Next, the conductive adhesive 34 is supplied so as to surround the protrusion 32 on the electrode pad 27 (conductive adhesive supplying step S340). In this case, the conductive adhesive 34 is applied with a dispenser. In the applied conductive adhesive 34, the thickness of the portion on the tip of the protrusion 32 is set to be larger than that of the mixed member supplied to the tip of the protrusion 33 in the supplying step S330.

The holding member 3 and base 24 are positioned so that the mixed member supplied in the supplying step S330 is held between the tips of the protrusions 33 and the facing surface 3a of the holding member 3 through the flexible thin film 4 and conductive film 5, and that the film-side facing electrode 5a faces the base-side facing electrode 8 (positioning step S350). By the positioning, the protrusion 33 is the protrusions 33 are positioned between the holding member 3 and base 24, and protrudes protrude toward the holding member 3 from the base 24. The facing surface 3a faces the protrusion 33 the protrusions 33.

Next, the positioned holding member 3 and base 24 are press-bonded (press-bonding step S360), and the thermosetting silicone adhesive contained in the bonding member in the mixed member, and the conductive adhesive 34 supplied in S349 are heated and hardened (hardening step S370). The interval between the holding member 3 and base 24 is equal to the sum of the thickness of the pad 29 (or the pad 30 or 31), the height of the protrusions 33, the dimension of the rigid members 14, and the thickness of the flexible thin film 4 and conductive film 5. The mixed member containing the silicone adhesive hardened in the hardening step S370 forms the bonding spacer member. Moreover, the film-side facing electrode 5a is conducted to the external electrode 11 by the function of the conductive adhesive 34.

Next, the flexible substrate 38 is prepared (flexible substrate preparing step S380), and the external electrode 9 and external electrode 11 are electrically connected to the electric wirings 43a and 44a of the flexible substrate 38 (connecting step S390). In this case, the film-side connecting member and external electrode 11 are electrically connected to the electric wirings 44a and 43a by the anisotropic conductive adhesive 37 through the intermediate electrodes 41 and 42.

In the electrostatic driving devices of the first, second, and third embodiments, the function member comprises the circular reflective film 6 formed of aluminum. However, the function member is not limited to this, and may also comprises a mirror having a hinge structure, which operates at a high speed in accordance with the bending of the flexible thin film 4. The electrostatic driving devices may be applied to an optical switch or an optical scanner that is of an electrostatic driving type.

Moreover, in the electrostatic driving devices of the first, second, and third embodiments, the rigid members are spherical, but the rigid members are not limited to this, and other shapes such as a columnar shape and a plate like shape may also be used.

It is to be noted that the present invention is not limited to the above-described embodiments, and can variously be modified or applied without departing from the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An electrostatic driving device comprising:
a flexible thin film;
a holding member, which holds the flexible thin film and allows the flexible thin film to bend;
a function member disposed on the flexible thin film;
a film-side facing electrode disposed on the flexible thin film;
a base, which faces the holding member;
a base-side facing electrode, which is disposed on the base and faces the film-side facing electrode; and
a bonding spacer member, which is held between the holding member and base, bonds the holding member to the base, and holds an interval between the holding member and base at a predetermined interval so as to keep an electrode interval between the film-side facing electrode and base-side facing electrode at a predetermined interval;
wherein the bonding spacer member includes a bonding member, which bonds the holding member and base, and rigid members, which have rigidity, and the rigid members keep the interval between the holding member and base at the predetermined interval and at least one of the bonding member and rigid members included in the bonding spacer member has conductivity, and
the electrostatic driving device further comprising;
a film-side connecting member, which is disposed on the holding member and electrically connects the film-side facing electrode to the bonding spacer member;
a first external electrode that is prepared for the flexible thin film, the first external electrode being disposed on the base; and
a base-side connecting member, which is disposed on the base and electrically connects the first external electrode to the bonding spacer member.

2. The electrostatic driving device according to claim 1, further comprising:
a second external electrode that is prepared for the base, the second external electrode being electrically connected to the base-side facing electrode; and
a flexible substrate including electric wirings,
wherein the first external electrode and second external electrode are electrically connected to the electric wirings of the flexible substrate.

3. The electrostatic driving device according to claim 1, wherein the rigid members are spherical.

4. The electrostatic driving device according to claim 1, wherein the bonding member contains an adhesive that hardens at normal temperature.

5. The electrostatic driving device according to claim 3, wherein the bonding member contains a low-elasticity silicone-based adhesive.

6. The electrostatic driving device according to claim 1 further comprising protrusions that are positioned between the holding member and base and protrude from one of the holding member and base, the other of the holding member and base including a facing surface that faces the tips of the protrusions, and
wherein the bonding spacer member is held between the tip of the protrusion and the facing surface.

* * * * *